United States Patent
Le Gonidec

(10) Patent No.: US 8,005,554 B2
(45) Date of Patent: Aug. 23, 2011

(54) DEVICE FOR CONTROLLING A REGULATED SYSTEM, AND AN ENGINE INCLUDING SUCH A DEVICE

(75) Inventor: Serge Le Gonidec, Vernon (FR)

(73) Assignee: SNECMA, Paris (FR)

( * ) Notice: Subject to any disclaimer, the term of this patent is extended or adjusted under 35 U.S.C. 154(b) by 422 days.

(21) Appl. No.: 12/389,812

(22) Filed: Feb. 20, 2009

(65) Prior Publication Data

US 2009/0228117 A1    Sep. 10, 2009

(30) Foreign Application Priority Data

Mar. 7, 2008   (FR) .................................. 08 51485

(51) Int. Cl.
*G06F 19/00* (2006.01)
*G05B 19/18* (2006.01)

(52) U.S. Cl. ................ 700/56; 700/55; 700/63; 700/67; 700/71

(58) Field of Classification Search .................... 700/55, 700/56, 63, 67, 71
See application file for complete search history.

(56) References Cited

U.S. PATENT DOCUMENTS

| | | | |
|---|---|---|---|
| 3,201,675 A | | 8/1965 | Curran |
| 4,280,083 A | | 7/1981 | Hirai et al. |
| 4,353,272 A | * | 10/1982 | Schneider et al. ............. 477/43 |
| 4,609,855 A | * | 9/1986 | Andrews ........................ 318/561 |
| 4,801,857 A | * | 1/1989 | Bundy ............................ 318/626 |
| 5,657,735 A | * | 8/1997 | Maki et al. .................... 123/673 |
| 5,974,434 A | * | 10/1999 | Rose .............................. 708/322 |
| 6,095,793 A | * | 8/2000 | Greeb .............................. 431/12 |
| 6,230,062 B1 | * | 5/2001 | Shah ............................... 700/29 |
| 6,810,843 B2 | | 11/2004 | Quinn, Jr. |
| 7,174,714 B2 | * | 2/2007 | Algrain .......................... 60/608 |
| 7,920,992 B2 | * | 4/2011 | Rutenbar et al. ................ 703/2 |
| 2002/0072356 A1 | * | 6/2002 | Yamashita et al. ............ 455/420 |
| 2007/0268068 A1 | * | 11/2007 | Yutkowitz ..................... 329/325 |
| 2010/0211194 A1 | * | 8/2010 | Bonefeld ........................ 700/52 |

OTHER PUBLICATIONS

"Stochastic Optimal Control of a Servo Motor with a Lifetime Constraint", Bogdanov et al, Rockwell Scientific Company, IEEE 2006.*
"Adaptive Friction Compensation fo Servo Mechanisms", Ge et al, National University of Singapore, IEEE 1999.*

* cited by examiner

*Primary Examiner* — Michael D Masinick
(74) *Attorney, Agent, or Firm* — Weingarten, Schurgin, Gagnebin & Lebovici LLP

(57) ABSTRACT

This device for controlling at least one operating variable of a regulated system comprising: a filter module for filtering at least one setpoint input to the control device, the module using a first order integrator; and a correction module for correcting the variable by servo-control, the module taking account of a measurement of the variable and of the setpoint as filtered by the filter module in order to generate at least one command for the system; a control module suitable for generating a gain control factor $\alpha$ on the basis of at least one parameter of the system and of an operating limit value associated with the parameter; and weighting means for weighting the gain of the filter module as a function of the factor and of the residue between the setpoint and its filtered value.

7 Claims, 4 Drawing Sheets

DEVICE FOR CONTROLLING A REGULATED SYSTEM, AND AN ENGINE INCLUDING SUCH A DEVICE

BACKGROUND OF THE INVENTION

The invention lies in the field of controlling the operation of a complex system.

It applies particularly, but not exclusively, to controlling an engine.

In general, regulated complex systems respond to external setpoints, with a regulation relationship adjusting internal operating variables that tend to bring the system to the operating point that complies with the setpoint, and to keep it there.

For example, with an engine, an increasing thrust setpoint has as its first effect an increase in the variable that is representative of pressure in the combustion chamber of the engine.

In order to regulate a complex system, it is known to use a setpoint that is filtered by a first order filter, as shown in FIG. 1A.

In this example, the filtered setpoint $C^*$ is obtained from the setpoint C by applying equation (1) below, in which the gain K represents the dynamic speed of the filter and $C^*_{n-1}$ is a preceding value of the filtered setpoint:

$$C^* = K \times (C - C^*_{n-1}) + C^*_{n-1} \quad (1)$$

In FIG. 1A, references 21, 24, and 25 designate respectively: a subtracter; an adder; and a delay; all three of which are known to the person skilled in the art.

Furthermore, complex systems usually include subsystems having internal parameters that need to be kept below respective operating limits, regardless of the operating conditions desired of the system.

For example, in an engine, the speed of rotation of a turbine must never exceed a predetermined limit value.

Conflicts can therefore arise between the need to comply with the operating limits of a subsystem and the objective of responding to the setpoints.

These conflicts can arise in particular due to poor knowledge of the utilization ranges while designing the system, or to drift over time in certain characteristics of the system.

In an attempt to mitigate this problem, the prior art proposes systems such as that shown in FIG. 1B, in which a saturator 26 is used for limiting the speed at which operating points change, and a saturator 27 is used to limit amplitude.

A saturator SAT concerning the rate at which a setpoint can change is applied to the parameter $K \times (C - C^*_{n-1})$, where the value of the filtered setpoint $C^*$ is obtained using equation (2) below:

$$C^* = \text{SAT}(K \times (C - C^*_{n-1})) + C^*_{n-1} \quad (2)$$

It is also possible to use a second saturator concerning the rate at which a setpoint can change, with the value of the filtered setpoint $C^*$ then being obtained by equation (3):

$$C^* = \text{SAT}(\text{SAT}(K \times (C - C^*_{n-1})) + C^*_{n-1}) \quad (3)$$

However, that solution is unsatisfactory since although it enables the rate of change of operating points to be slowed down while tending towards the setpoint, and although it enables the setpoint to be limited, it does not in any way guarantee that critical parameters of the subsystems are kept within their own operating limits.

OBJECT AND SUMMARY OF THE INVENTION

The invention provides a device for controlling a regulated system enabling it to tend towards a desired setpoint while giving priority to complying with operating limits for internal parameters of the system.

More precisely, the invention provides a control device for controlling at least one operating variable V of a regulated system, the device comprising:

a filter module for filtering at least one setpoint input to the control device, the filter module using a first order integrator;

a correction module for correcting the variable V by servo-control, the correction module taking account of a measurement of the variable V and of the setpoint $C^*$ as filtered by the filter module in order to generate at least one command U for the system;

a control module suitable for generating a gain control factor $\alpha$ on the basis of at least one parameter P of the system and of an operating limit value $LF_P$ associated with the parameter P; and weighting means for weighting the gain K of the filter module as a function of the factor $\alpha$ and of the residue $\epsilon$ between the setpoint C and its filtered value $C^*$.

In general, the gain of the filter module, in other words the speed of the filter, is adjusted so that the above-mentioned parameter complies with its operating limit.

In accordance with the invention, this constraint has priority over complying with the setpoint.

In a particular embodiment of the invention, the control module obtains the factor $\alpha$ by a relationship of the type $\alpha = f(\delta)$, where $\delta$ is the difference between the parameter P and the operating limit $LF_P$, and f is a saturated affine function.

The person skilled in the art will understand that the normal passband of the filter is obtained when $\alpha = 1$.

Advantageously, the gain control factor $\alpha$ can take negative values, serving to define the rate at which the critical parameter returns to below its operating limit in the event of exceeding it.

In accordance with the invention, a plurality of constraints may be implemented simultaneously.

In this particular embodiment of the invention, the control module takes account of a plurality of system parameters and selects the gain control factor as being the minimum value of the values $\alpha_i$, where $\alpha_i = \underline{f}(\delta_i)$, $\delta_i$ being the difference between a parameter $P_i$ and its operating limit $LF_{Pi}$, and $\underline{f}$ being a saturated affine function.

In a preferred embodiment of the invention, the difference between the protected parameter and its operating limit is taken into account only when the residue between the setpoint and its filtered value is positive (an instruction to raise the operating point), the gain of the filter not being weighted when the residue is negative (an instruction to lower the operating point).

Advantageously, this characteristic makes it possible to brake the rate of change of operating points when the protected parameter approaches its operating limit, while applying a normal speed ($\alpha$ not applied) when instructing a lowering of the setpoint, in other words movement away from the operating limit.

In a particular embodiment of the invention, the control module sets the gain control factor to a constant on detecting at least one predetermined event.

It is thus possible to short circuit or inhibit the function of calculating the gain control factor and to return it to its initial value or to some other predetermined value.

In a particular embodiment of the invention, the correction module applies a multivariable command relationship of the Predictive Internal Model (PIM) type. This multivariable command makes it possible to obtain a large stability margin. It is also very robust in systems that have a parameter that varies moderately.

The invention also provides an engine including two pumps feeding a combustion chamber with two propellant components, the flow rate of each of the components being adjustable by means of respective valves, the engine including a control device as specified above, in which:

the operating variables V are a pressure PC in the combustion chamber and a ratio RM of the mass flow rates of the two components delivered to the chamber;

the setpoints C are a setpoint $PC_C$ for pressure in the combustion chamber, and a setpoint $RM_C$ for the ratio of the mass flow rates of the two components delivered to the chamber;

the parameters P are speeds of rotation of the pumps; and the commands U are commands for adjusting the extent to which the valves are opened.

BRIEF DESCRIPTION OF THE DRAWINGS

Other characteristics and advantages of the present invention appear from the following description, with reference to the accompanying drawings that show an embodiment having no limiting character. In the figures.

DETAILED DESCRIPTION OF AN EMBODIMENT

Figure 2:
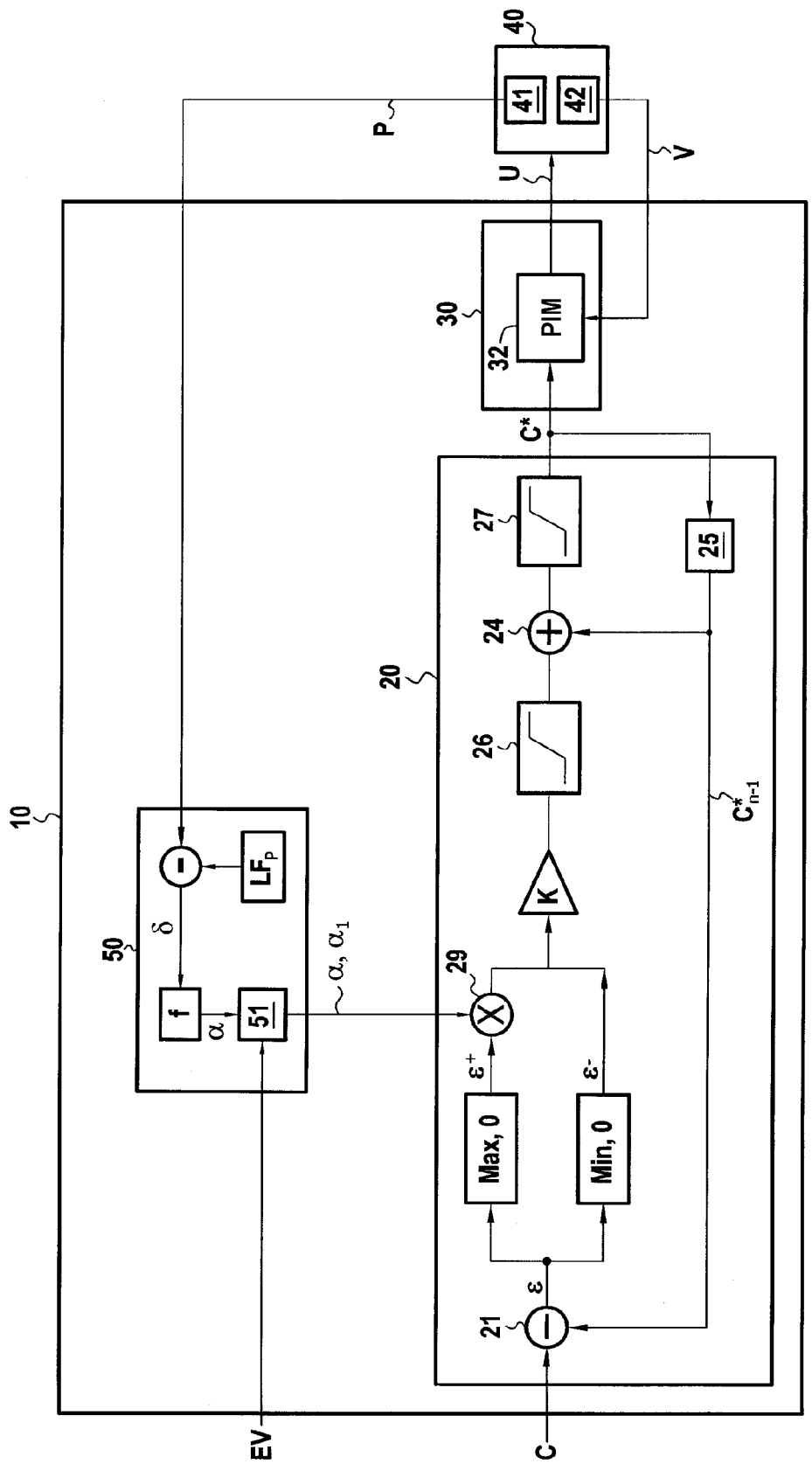
FIG. 2 shows a particular embodiment of a control device in accordance with the invention in its environment.

FIG. 2 shows a particular embodiment of a control device in accordance with the invention.

In the example described below, the control device 10 controls an operating variable V of a regulated system 40.

It is assumed that the control device 10 has an input receiving a setpoint C, this setpoint C being filtered by a filter module 20, the filtered setpoint being written C*. The difference ε between the setpoint C and its filtered value C* is referred to below as the "residue":

$$\epsilon = C - C^* \quad (4)$$

The filtered setpoint C* is one input to a module 30 for correcting the variable V of the regulated system 40 by servo-control.

Figure 1A:
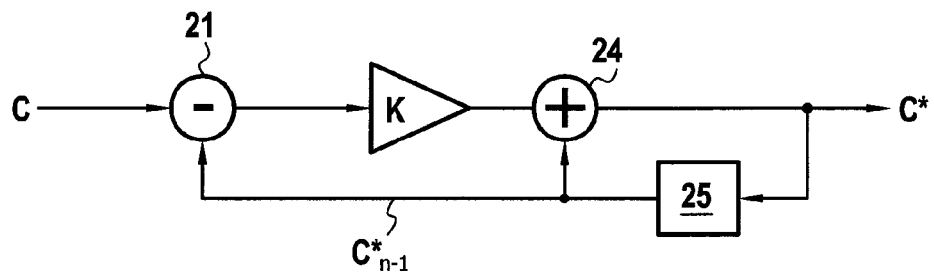
FIGS. 1A and 1B, described above, show setpoint filter modules known in the prior art.
Figure 1B:
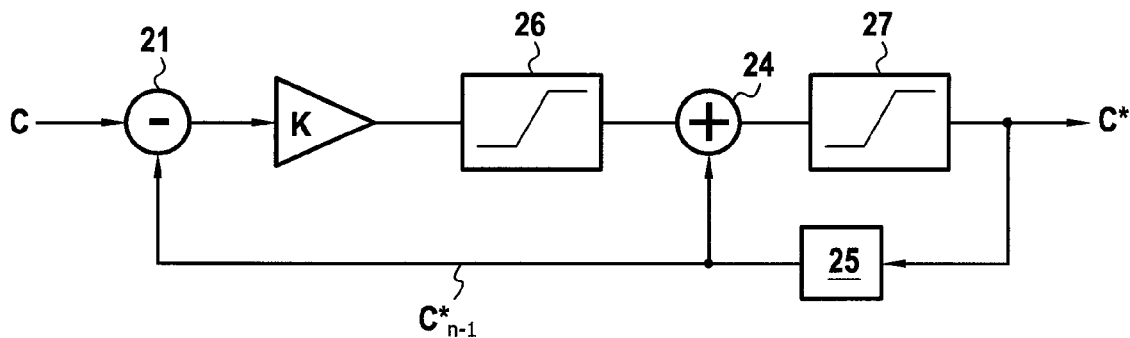

This correction module 30 generates a command U that is applied to the regulated system 40. As in the prior art, the filter module 20 includes a subtracter 21, an adder 24, and a delay 25. In the example described here, it also includes two optional saturators 26 and 27 having effects that are identical to those described with reference to FIG. 1B.

However, in accordance with the invention, the gain K of the filter module 20 can be weighted as a function of the residue ε and of a weighting factor α, $α_1$ so as to guarantee that a critical parameter P of the regulated system 40 complies with a operating limit $LF_P$.

For this purpose, the control device in accordance with the invention has a module 50 that receives as input the value of the parameter P of the regulated system 40.

In the embodiment described, the control module 50 comprises a processor 51 suitable for determining whether a predetermined event is occurring.

If so, the processor 51 sets the weighting factor to be equal to a constant $α_1$.

Otherwise, if no predetermined event is detected, then the processor 51 generates a gain control factor α by applying a relationship α=f(δ), where δ is the difference between the value of the parameter P and the operating limit $LF_P$ for this parameter, the limit $LF_P$ being stored in the control module 50.

An example of a profile for the factor α is described below with reference to FIG. 3.

There follows a detailed description of how the weighting is calculated for the gain K of the filter module in the embodiment described.

In this example, two situations can arise as a function of the sign of the residue ε.

When the residue is positive ($ε^+$), the filtered setpoint C* is obtained at the output from the multiplier 29 in application of equation (5) if the control module 50 has detected an event EV, or otherwise in application of equation (6):

$$C^* = C^*_{n-1} + K \cdot \epsilon^+ \cdot \alpha_1 \quad (5)$$

$$C^* = C^*_{n-1} + K \cdot \epsilon^+ \cdot \alpha \quad (6)$$

In the embodiment described, when the residue ε is negative ($ε^-$), gain weighting is not implemented.

Under such circumstances, the filtered setpoint C* is obtained by equation (7):

$$C^* = C^*_{n-1} + K \cdot \epsilon^- \quad (7)$$

In the embodiment described, the correction module 30 includes means 32 for generating the command U in application of a command relationship of the Predictive Internal Model type, said module 32 having as inputs: firstly the filtered setpoint C*, and secondly the operating variable V of the system 40.

The regulated system 40 has two ports 41 and 42 enabling the control module 50 and the correction module 30 respectively to obtain the value of the critical parameter P that needs to be monitored and the value of the operating variable V of the system.

Figure 3:
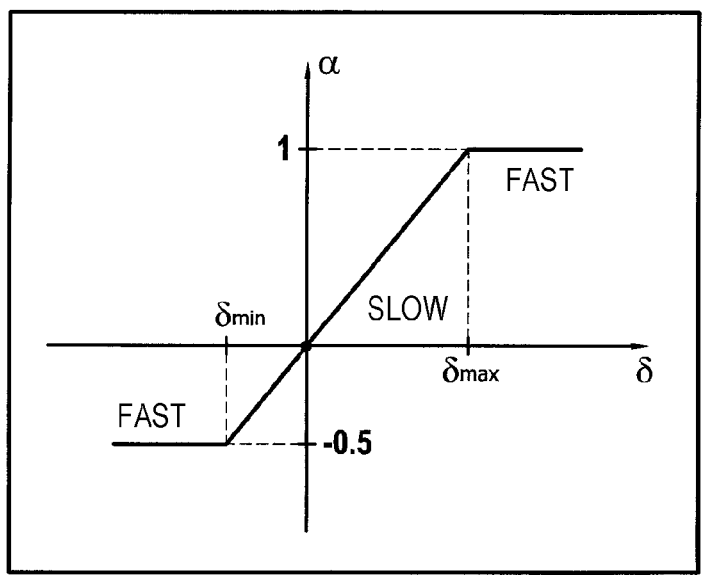
FIG. 3 shows an example of a profile for the gain control factor α that can be used in a particular embodiment of the invention.

In FIG. 3, there can be seen an example of a profile for the gain control factor α used for weighting the gain K* of the filter module 20 when the residue ε is positive.

This factor α is obtained by a relationship of the type α=f(δ), where δ is the difference between the parameter P and its operating limits $LF_P$, and f is a saturated affine function.

In the example described, two values $δ_{MIN}$ and $δ_{MAX}$ are defined such that:

if δ is greater than $δ_{MAX}$, then α=1; and if δ is less than $δ_{MIN}$, then α=−0.5.

This profile thus defines a range in which the tracking speed is slowed down when δ lies in the range $δ_{MIN}$ to $δ_{MAX}$, and two stages in which this speed varies fast when the parameter P departs from its operating limit $LF_P$.

Figure 4:
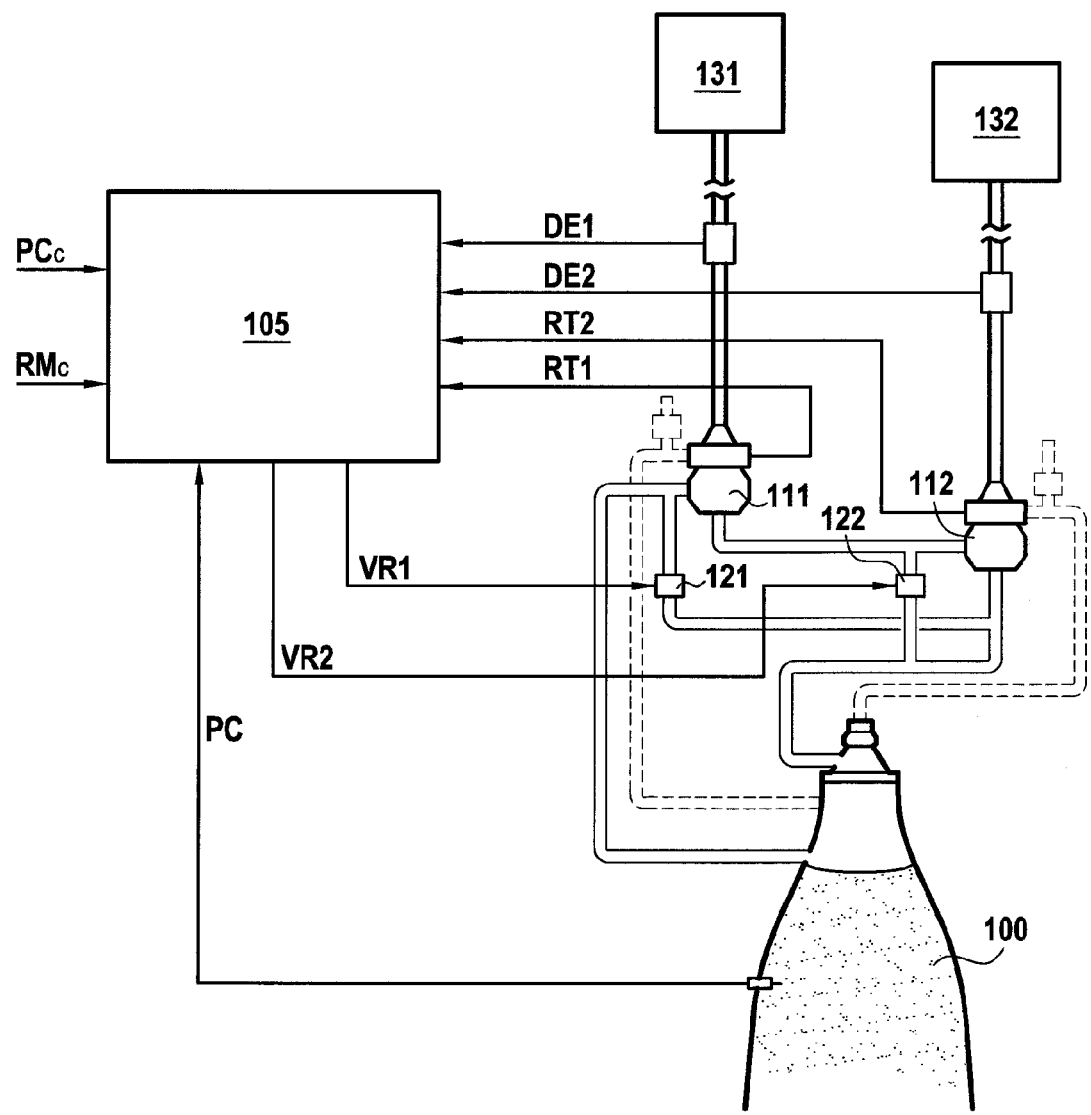
FIG. 4 shows a particular embodiment of an engine in accordance with the invention.

FIG. 4 shows an engine in accordance with the invention.

The engine has two propellant component tanks referenced 131 and 132, each of which is upstream from a respective pump 111 or 112. The delivery rate of each of these propellant components can be regulated by a respective valve 121, 122.

In the embodiment described, the engine includes a controller 105 adapted to obtain:

a measurement of the flow rate DE1 of propellant components upstream from the pump 111;

a measurement of the flow rate DE2 of propellant components upstream from the pump 112; and the speeds of rotation RT1 and RT2 of the pumps 111 and 112, together with the pressure PC in the combustion chamber 100.

The controller 105 is adapted to generate commands VR1 and VR2 for controlling the extent to which each of the valves 121 and 122 is opened.

In this example, the controller 105 receives two setpoints, namely a setpoint $PC_C$ for pressure in the combustion chamber 100, and a setpoint $RM_C$ for the ratio of the mass flow rates of the two propellant components delivered to the combustion chamber 100.

The controller 105 thus continuously monitors the values of the regulated parameters, i.e. the pressure PC in the combustion chamber 100 and the ratio RM of the flow rates DE1 and DE2 upstream from the pumps 111 and 112.

The controller 105 constitutes a controller device in the meaning of the invention, in which:

the operating variables are the pressure PC in the combustion chamber and the ratio RM of the two propellant component flow rates;

the setpoints are the setpoint $PC_C$ for pressure in the combustion chamber and the ratio $RM_C$ for the propellant component flow rates delivered to said chamber;

the critical parameters being monitored are the speeds of rotation RT1 and RT2 of the pumps, these parameters being associated with operating limits stored in the controller 105; and the commands are commands that adjust the extent to which the values 121 and 122 are open.

Thus, the invention serves to adjust the positioning of the valves 121 and 122 so as to cause the regulated variables PC and RM to converge on the setpoint vector ($PC_C$, $RM_C$), this regulation being constrained to comply with the functional limit in terms of speed of rotation of the pumps 111 and 112.

The invention is particularly advantageous when certain internal members of the engine deteriorate, where such deterioration leads to the pumps operating at excessive speeds of rotation RT1 and RT2.

Under such circumstances, the invention makes it possible to limit the speeds of rotation of the pumps to below their operating limits, at the expense of failing to comply with the pressure and propellant component ratio setpoints $PC_C$ and $RM_C$.

Figure 5A:
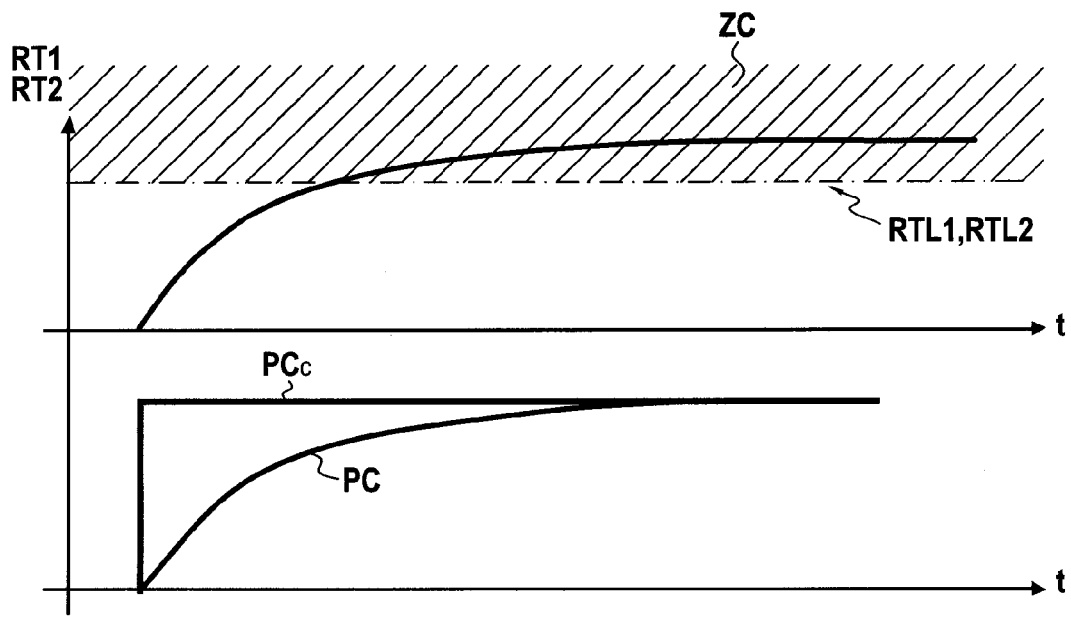
FIGS. 5A and 5B show the advantage of implementing the invention in the FIG. 4 engine.
Figure 5B:
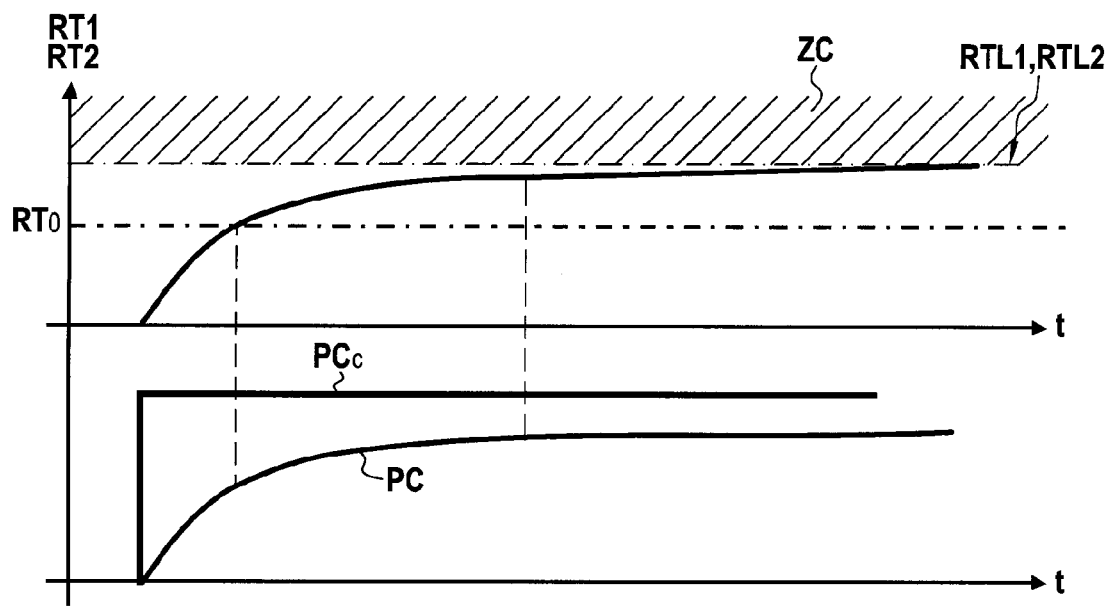

FIGS. 5A and 5B show the advantage of the invention.

In FIG. 5A, there can be seen the operation of an engine of the type shown in FIG. 4 when the invention is not implemented.

In the bottom portion of FIG. 5A, it can be seen that the regulated variables "pressure in the chamber (PC)" and "propellant component flow rate ratio (RM)" continue to tend towards their setpoints, even if the internal parameters of the engine, i.e. the speeds of rotation of the pumps (RT1, RT2) exceed their operating limits RTL1 and RTL2, thereby entering a critical operating zone ZC.

FIG. 5B shows the operation of the FIG. 4 engine.

It can be seen in the top portion of FIG. 5B that the speeds of rotation of the pump 111 and 112 never reach the operating limits RTL1 and RTL2.

This is made possible by regulating the tracking speed of the setpoint filter, this setpoint being slowed or braked once the speed of rotation of a pump reaches a predetermined value $RT_0$. The person skilled in the art will understand, with reference to FIG. 3, that the value $RT_0$ satisfies equation (8):

$$d_{MAX} = RTL1 - RT_0 \tag{8}$$

In FIG. 5B, it can be seen that it has been decided to give precedence to the speed of rotation of the pumps over complying with the setpoint.

What is claimed is:

1. A control device for controlling at least one operating variable V of a regulated system, the device comprising:

a filter module for filtering at least one setpoint C input to said control device, the filter module using a first order integrator; and a correction module for correcting said at least one variable V by servo-control, said correction module taking account of a measurement of said variable V and of said at least one setpoint C* as filtered by said filter module in order to generate at least one command U for said system;

wherein said device includes:

a control module suitable for generating a gain control factor α on the basis of at least one parameter P of said system and of an operating limit value $LF_P$ associated with said parameter P; and weighting means for weighting the gain K of said filter module as a function of said factor α and of the residue ε between said setpoint C and its value C* as filtered by said filter module.

2. A device according to claim 1, wherein said control module obtains said factor α by a relationship of the type α=f(δ), where δ is the difference between said parameter P and said operating limit $LF_P$, and f is a saturated affine function.

3. A device according to claim 1, wherein said control module takes account of a plurality of parameters of said system, and wherein said factor α is selected as being the minimum value of the values $α_i$, where $α_i$=f($δ_i$), $δ_i$ being the difference between a parameter $P_i$ and its operating limit $LF_{Pi}$, and f is a saturated affine function.

4. A device according to claim 1, wherein the gain K of said filter module is not weighed when said residue ε is negative $ε^-$.

5. A device according to claim 1, wherein said control module sets said factor α to a constant $α_1$ on detecting at least one predetermined event.

6. A device according to claim 1, wherein said correction module applies a multivariable command relationship of the Predictive Internal Model type.

7. An engine including two pumps feeding a combustion chamber with two propellant components, the flow rate of each of said components being adjustable by means of respective valves, the engine including a control device according to claim 1, in which:

said operating variables V are a pressure PC in said combustion chamber and a ratio RM of the mass flow rates of the two components delivered to said chamber;

said setpoints C are a setpoint $PC_C$ for pressure in said combustion chamber, and a setpoint for the ratio of the mass flow rates of the two components delivered to said chamber;

said parameters P are speeds of rotation of said pumps; and said commands U are commands for adjusting the extent to which said valves are opened.

* * * * *